J. L. CREVELING.
ELECTRIC REGULATION.
APPLICATION FILED NOV. 5, 1910.
1,162,460.
Patented Nov. 30, 1915.
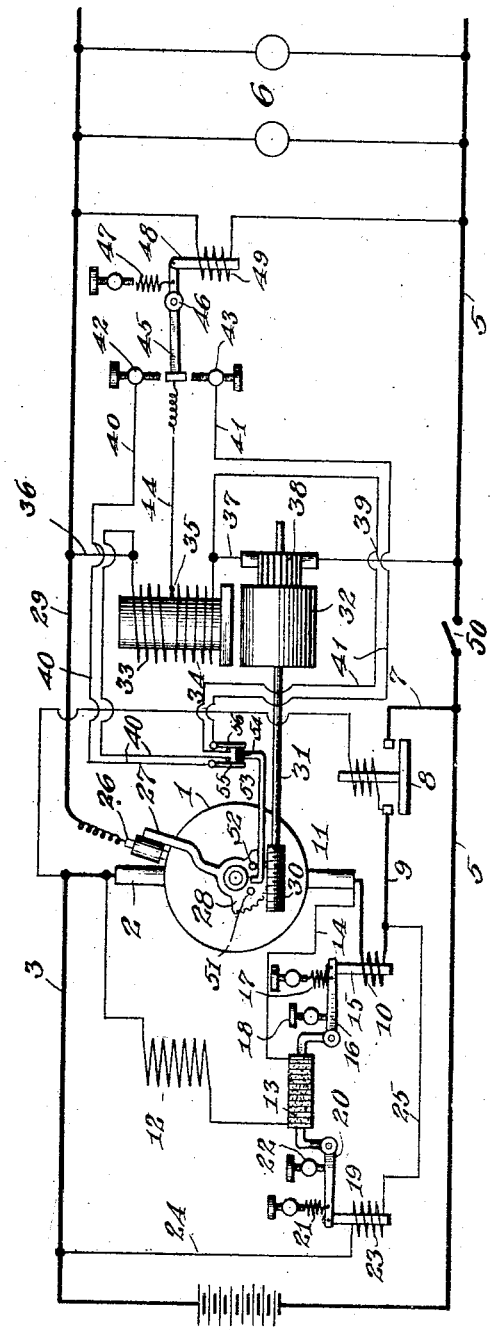
WITNESSES:
INVENTOR

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,162,460. Specification of Letters Patent. Patented Nov. 30, 1915.

Application filed November 5, 1910. Serial No. 590,834.

*To all whom it may concern:*

Be it known that I, JOHN L. CREVELING, a resident of New York, in the county and State of New York, have invented certain new and useful Improvements in Electric Regulation, as set forth in the annexed specification and drawing, forming a part thereof.

My invention pertains to that class of electric regulation wherein it is desired to automatically regulate an electric circuit.

My invention has for its particular object to provide means whereby the current in, or the voltage impressed upon an electric circuit may be automatically governed in a predetermined manner, as for example, be held constant.

As my invention is particularly applicable to that class of electric systems wherein a dynamo or generator driven at variable speeds is used to operate a storage battery and lamps or other translating devices, upon which translating devices it is desired to impress a constant voltage, it will be described with reference to such a system.

The drawing is a diagram of one type of such a system employing my invention.

In the drawing, 1 represents the commutator of a suitable dynamo provided with the positive brush 2 from which the lead 3 is carried to the positive side of the storage battery 4, from the negative side of which the lead 5 is carried to the negative side of lamps or translating devices 6. The lead 7 is connected with the lead 5 and carried to one side of the automatic switch indicated at 8, the opposite side of which is connected as by lead 9, with one end of the solenoid 10, the other end of which is connected with the negative brush 11 in contact with the commutator 1.

12 represents the field winding of the generator and has one of its ends connected to the brush 2 and the other end to one side of the variable resistance 13, in this instance indicated as a carbon pile. The opposite side of the carbon pile 13 is connected as by wire 14 with the negative brush 11.

15 is a core of iron or other magnetic material carried by the bell crank lever 16 in such manner that energization of the coil tends to depress the lever 16 so as to reduce the pressure upon the carbon pile 13 and increase the resistance thereof.

17 is an adjustable spring opposing the action of the coil 10 and tending to compress the carbon pile 13 and decrease its resistance.

18 is an adjustable screw for limiting the motion that can be given to the lever 16 by the spring 17.

19 is a core of iron or other magnetic material carried by the lever 20 normally drawn in an upward direction by the adjustable spring 21 which tends to compress the carbon pile 13 and decrease its resistance.

22 is an adjustable screw for limiting the motion that can be given to the lever 20 by the spring 21.

23 is a solenoid surrounding the core 19 and tending when energized to draw the same downwardly so as to decrease the pressure on the carbon pile 13 and increase its resistance. One end of the solenoid 23 is connected with the lead 3 as by wire 24, while the opposite end of the solenoid is connected as by wire 25 with the lead 9.

26 represents a brush carried by the rocker 27 having the same center as the commutator 1, about which it may be revolved throughout certain limits by means of the segment 28 engaging the worm 30.

29 represents the positive translation circuit lead which is carried from the brush 26 to the positive side of the translating devices 6.

The worm 30 is connected by the shaft 31 with the armature 32 of a small motor provided with equally balanced differential field windings 33 and 34, which are joined at the point 35. The coil 33 has its remaining end connected to the main 29 as by wire 36, and the remaining end of 34 is connected as by wire 37 with one of the brushes bearing upon the commutator 38, the other brush of which is connected with the lead 5 as by wire 39. Wires 36 and 37 are connected as by wires 40 and 41 with the adjustable contact screws 42 and 43 respectively, the wire 40 having in circuit therewith the switch 55 and the wire 41 having in circuit therewith the switch 56. These switches tend to close their respective circuits and may be opened by contact with the member 54 carried upon the rod 53 which may be engaged by either pin 51 or pin 52 when the brush 26 reaches the desired limit of rotation in either direction, in a manner which will hereinafter more plainly appear.

The joined ends of the differential windings 33 and 34 as indicated at 35, are flexibly connected as by wire 44 with the lever 45 carrying a suitable contact adapted to make connection with the adjustable screws 42 and 43 as the lever is swung from one side to the other from its normal position. The lever 45 is carried by the pivot 46 and normally drawn by the adjustable spring 47 in such direction as to tend to cause contact with the screw 43.

48 is a core of iron or other magnetic material carried by the lever 45 and surrounded by the solenoid 49, placed in multiple with the translation circuit as indicated. Energization of the coil 49 tends to draw the core 48 downwardly and cause contact between 45 and 42 against the action of spring 47.

50 represents any suitable type of switch which may be used for making or breaking the translation circuit.

The practical operation of my invention is substantially as follows:—If the generator be started, current will flow from the brush 2 through the field winding 12, carbon pile 13, wire 14 to the negative brush 11 and cause the field to build up in a well known manner, and if the voltage of the generator be brought up to that at which the switch 8 is adjusted to close, the generator will be thrown in circuit with the battery 4 and current will flow from the brush 2, through lead 3, storage battery 4, lead 5, wire 7, switch 8, wire 9, and coil 10 to the negative brush 11, if the voltage be above that of the battery. In practice I prefer to make the switch 8 open and close at substantially the battery voltage and as the particular type of switch employed for this purpose forms no part of my present invention, I have indicated the simplest form of automatic switch operated by a coil in shunt across the generator leads, which indicates with sufficient clearness that the said switch is operated when a certain voltage is reached across the generator. I now so adjust the spring 17 that when the maximum desired output of the generator is flowing through the coil 10, any increase above this amount will cause the core 15 to be drawn downwardly in such manner as to increase the resistance of the carbon pile 13 and prevent the current output from rising above this predetermined maximum. I also adjust the spring 21 so that when the desired maximum voltage across the leads 3 and 9 is reached any further increase in voltage will cause the core 19 to be drawn downwardly and increase the resistance 13 in such manner as to prevent the generator voltage rising above this maximum. In practice I find it advisable to make this maximum voltage substantially equal to the voltage of the battery 4 when fully charged. With the resistance 13 regulated in this manner, it will be obvious that at no time will the battery be charged above its maximum rate and that as the voltage across the battery rises, due to its being charged, the rate will be tapered off owing to such rise. If now, with the generator running at proper speed, the switch 50 be closed, current will flow from the brush 26, through main 29, translating devices 6 and main 5, switch 50, lead 7, switch 8, lead 9 and coil 10 to the brush 11 and the voltage across the translating devices 6 will depend upon the position of the brush 26. In practice I make the brush 26 capable of revolution in a left handed direction until in the same plane as the brush 2, and, when in this position it is obvious that the voltage impressed upon the translating devices 6 will be the same as if the main 29 were connected directly with the lead 3, and that the voltage across the translation circuit will be equal to the generator circuit voltage and it will be obvious that the voltage across the translating devices 6 will be decreased as the brush 26 is revolved in a right handed direction. When the switch 50 is closed, current will flow from main 29, through wire 36, coil 33, coil 34, wire 37, windings of armature 32, commutator 38, wire 39, to the lead 5. Current flowing through the armature 32 will energize the same but no motion will be given to the armature when the current in the coils 33 and 34 is equal, inasmuch as they are equal differential windings having equal opposed magneto-motive forces. Current will also flow through the solenoid 49 and this current will depend upon the voltage impressed upon the translation circuit and I so adjust the spring 47 that when the normal translation circuit voltage is reached, the lever 45 will stand in the position shown in the drawing, that is out of contact with either of the screws 42 or 43. I so construct the mechanism operated by the coil 49 that when this normal voltage is slightly exceeded, the lever 45 will be swung in such direction as to make contact with the screw 42 and thus connect the wire 44 with the wire 40 and shunt out the winding 33. This will cause a strong field due to the winding 34 and cause the armature 32 to revolve, which, in turn, will revolve the worm 30 so as to rotate the segment 28 and rocker 27 in such manner as to swing the brush 26 in a right handed direction and thus cut down the voltage across the translating circuit. When the voltage has again been cut down to the normal, the lever 45 will return to the position shown in the drawing. Any decrease in voltage below the normal will allow the spring 47 to throw the lever 45 into contact with the screw 43 and shunt out the winding 34 in such manner as to cause the motor to revolve in the reverse direction and cause the brush 26 to be revolved in a left handed direction and the voltage across the translation circuit to be increased to the normal when the lever 45 will return to the position indicated in the drawing.

The limit of travel or rotation in a left handed direction that may be given to the brush 26 is fixed by the pin 51, which when the limit is reached will make contact with the member 53 in such manner as to move the same in a right handed direction and open the spring switch 56 which will open the wire 41 and thus cause the fields 33 and 34 to be opposed and the motor thus stopped until contact is caused between 45 and 42 which contact will cause the brush 26 to be swung in a right handed direction and thus move the pin 51 so that the spring switch 56 may again close the wire 41 in such manner that previously described operation upon contact between 45 and 43 can be repeated. If, however, contact between 45 and 42 continue to be made until the limit at which it is desired to stop the brush 26 in a right handed direction be reached, the pin 52 will move the member 53 in a left handed direction and cause member 54 to open the spring switch 55 and break the shunt around the coil 33 and allow the fields 33 and 34 to be neutralized and thus stop the motor until contact again be made between 45 and 43 which contact will move the brush 26 in a left handed direction and allow the switch 55 to close when contact between 45 and 42 will operate to move the brush 26 in a right handed direction as above mentioned until its limit is reached.

From the foregoing it will be obvious that I have produced a system wherein a generator may be driven at variable speeds and used to charge a storage battery and operate lamps or other translating devices wherein the current output of the generator is automatically held within prescribed limits and the charging voltage automatically controlled so as not to exceed a certain desired limit and in which the voltage upon the lamps or translating devices, while at times lower than the charging voltage is automatically regulated and held constant without the use of wasteful ohmic resistances or power consuming devices serving to set up counter-electro-motive forces commonly known in the art as "buckers".

I do not wish in any way to limit myself to any of the constructions shown in the accompanying drawing which is a mere diagrammatic representation of one form of system embodying the elements of my invention for it is obvious that wide departures may be made in the way of detail of construction and design, without departing from the spirit and scope of my invention, which is as set forth in the following claims:—

1. An electric system comprehending a generator, a storage battery and a translation circuit receiving current from the storage battery, means whereby current is supplied to the storage battery by said generator at a predetermined voltage, means whereby current is supplied to the translation circuit by said generator at the same or a different voltage and means for controlling the voltage supplied by the generator to the translation circuit and to the battery, so as to keep the battery voltage substantially constant and the translation voltage substantially constant.

2. An electric system comprehending a generator a storage battery and a translation circuit receiving current from the storage battery, means whereby current is supplied to the storage battery by said generator at a predetermined voltage, means whereby current is supplied to the translation circuit by said generator at the same or a different voltage and means for controlling the generator voltage impressed upon the translation circuit and the battery by said generator responsive to voltage fluctuations in the system, so as to keep the battery voltage substantially constant and the translation circuit voltage substantially constant.

3. An electric system comprehending a generator, a storage battery and a translation circuit receiving current from said battery, means whereby current is supplied to the storage battery by said generator at a predetermined voltage, means whereby current is supplied to the translation circuit by said generator at the same or a different voltage and means for controlling the generator voltage and the battery voltage by current taken from said generator, responsive to voltage fluctuations across the translation circuit, to keep the battery voltage substantially constant and the translation circuit voltage substantially constant.

4. An electric system comprehending a dynamo, a storage battery and a translation circuit receiving current from said battery, means for connecting the battery with the generator at a point having sufficient electro-motive force to charge the battery at a predetermined voltage, means for connecting the translation circuit with the generator, capable of connection with points of said generator having various voltages, and automatic means for governing the battery connecting means and to hold the voltage on the translation circuit and the battery substantially constant.

5. An electric system comprehending a generator, a storage battery and a translation circuit in operative communication with said battery, means for connecting the battery across the generator, means for automatically governing the generator to effect the charging of the battery at a predetermined voltage, means for connecting the translation circuit with the generator to receive variable voltages therefrom and means for controlling said connection responsive to voltage fluctuations and adapted to maintain such connection at a point of uniform voltage regardless of the generator voltage impressed upon the battery.

6. An electric system comprehending a dynamo, a translation circuit, a storage battery delivering current to the translation circuit and connected across said dynamo at substantially its point of maximum voltage, means for controlling said dynamo in the charging of said battery, means for connecting the translation circuit across the dynamo at points of various voltages and automatic means for controlling the said connection of the translation circuit across said dynamo, comprehending means for changing said point of connection of the translation circuit with the dynamo responsive to changes of voltage.

7. An electric system comprehending a dynamo, a translation circuit, a storage battery delivering current to the translation circuit and connected across said dynamo at substantially its point of maximum voltage, means for controlling said dynamo to effect the charging of said battery, means for connecting the translation circuit across the dynamo at points of various voltages and automatic means for controlling the said connection of the translation circuit across said dynamo, comprehending means for changing said points of connection of the translation circuit with the dynamo responsive to changes of voltage in the translation circuit.

8. The combination with a generator having a field circuit, a storage battery in operative relation to the generator, means for governing the field circuit to cause the generator to charge the storage battery at a predetermined voltage and operated in accordance with the charging thereof, translating devices, and means connecting the same in operative relation to the generator and storage battery, and means for controlling the voltage impressed by the generator upon the translating devices to maintain said voltage constant whether greater or less than the storage battery voltage.

9. The combination with a generator having a field circuit, a storage battery in operative relation thereto, means for governing the field circuit to cause the generator to charge the storage battery at a predetermined voltage and operated in accordance with the charging thereof, translating devices and means connecting the same in operative relation to the generator and storage battery and means for controlling the voltage impressed by the generator upon the translating devices in response to voltage fluctuations across the translating devices to maintain said voltage constant whether greater or less than the storage battery voltage.

JOHN L. CREVELING.

Witnesses:
M. HERSKOVITZ,
A. E. TUERS.

Copies of this patent may be obtained for five cents each, by addressing the "Commissioner of Patents, Washington, D. C."